United States Patent
Jayakrishnasamy et al.

(10) Patent No.: US 12,524,614 B2
(45) Date of Patent: Jan. 13, 2026

(54) METHOD AND SYSTEM FOR AUTOMATED Q AND A VIA ENRICHED TEXT SIMILARITY

(71) Applicant: Verizon Patent and Licensing Inc., Basking Ridge, NJ (US)

(72) Inventors: Miruna Jayakrishnasamy, Vellore (IN); Prakash Ranganathan, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 424 days.

(21) Appl. No.: 18/158,871

(22) Filed: Jan. 24, 2023

(65) Prior Publication Data

US 2024/0249078 A1 Jul. 25, 2024

(51) Int. Cl.
*G06F 40/289* (2020.01)
*G06F 40/35* (2020.01)
*G06N 3/063* (2023.01)

(52) U.S. Cl.
CPC ............ *G06F 40/289* (2020.01); *G06F 40/35* (2020.01); *G06N 3/063* (2013.01)

(58) Field of Classification Search
CPC ...................................................... G06F 40/40
See application file for complete search history.

(56) References Cited

U.S. PATENT DOCUMENTS

| | | | |
|---|---|---|---|
| 10,467,270 B2 * | 11/2019 | Fan ......... | G06F 16/313 |
| 2007/0203863 A1 * | 8/2007 | Gupta ...... | G06N 20/00 706/20 |
| 2018/0329881 A1 * | 11/2018 | Bennett .... | G06F 40/20 |
| 2022/0358153 A1 * | 11/2022 | Mishra ..... | G06F 18/22 |

\* cited by examiner

*Primary Examiner* — Bhavesh M Mehta
*Assistant Examiner* — Joseph J. Yamamoto

(57) ABSTRACT

The present teaching relates to a hierarchical and explainable (HE) similarity and use thereof. A target text is identified based on a source text. A HE similarity characterizes the similarity between the source and target texts in terms of multiple assessment categories and is computed based on source and target phrases generated via linguistic features. A HE feature vector is constructed with similarity scores at phrase, word, and character levels. The HE similarity is computed based on the HE feature vector and used to determine whether the target text related to the source text. The HE similarity is used to determine whether the target text relates to the source text.

21 Claims, 17 Drawing Sheets

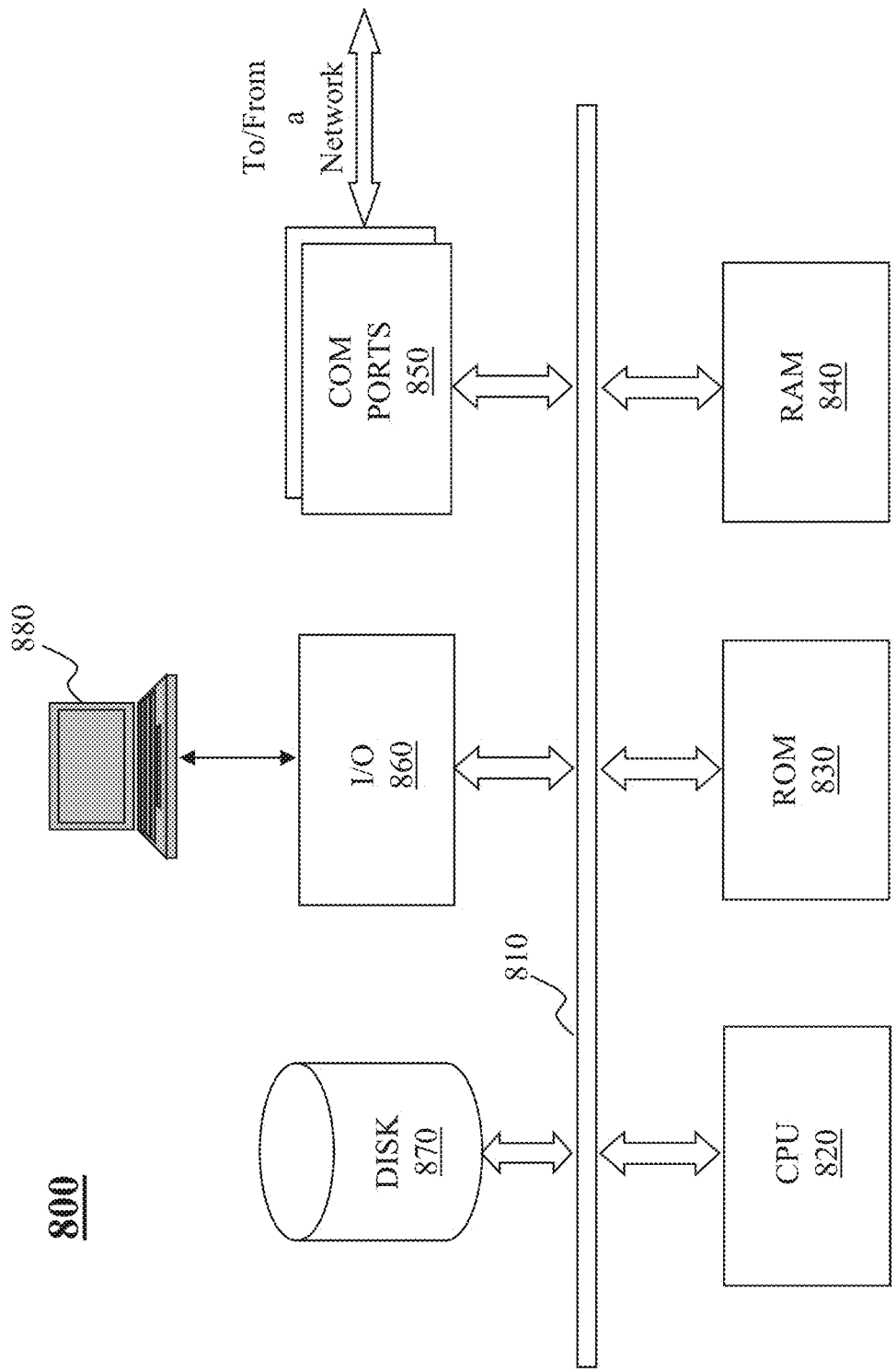

METHOD AND SYSTEM FOR AUTOMATED Q AND A VIA ENRICHED TEXT SIMILARITY

BACKGROUND

A similarity metric quantifies a degree of likeness between two entities, which can be two objects in an image/video, and/or two sets of text. A similarity score is traditionally represented as a scalar value, usually determined based on a computed distance between the two things that are being evaluated. For example, a customer may seek an answer about a product/service on a company website. To provide the answer sought by the customer, the similarity between the text query entered on the website from the customer and the text representing a prepared or expected question plays an essential role as to whether the answer can be correctly identified. As much of the communication in commerce is nowadays frequently conducted via text so that measuring similarity between two pieces of text is important.

BRIE DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 5A:
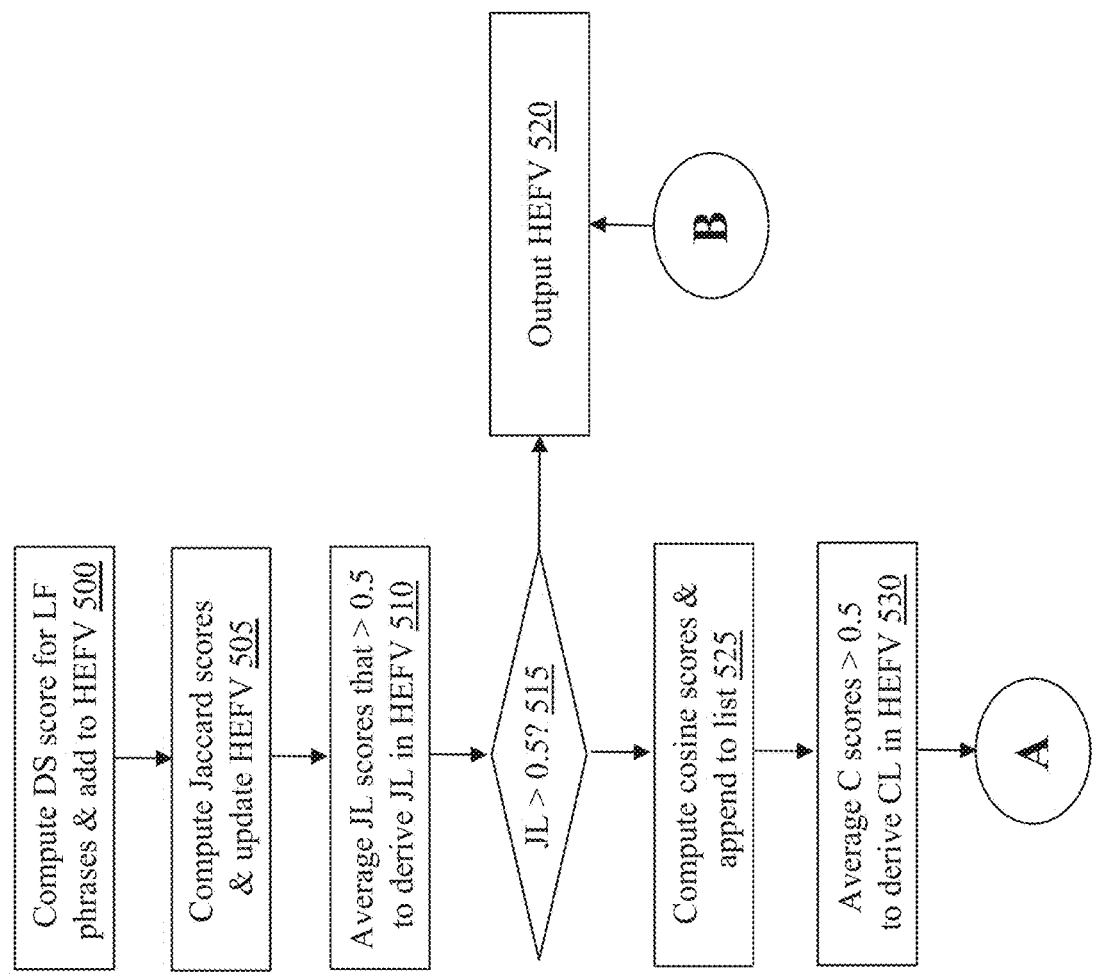
Figure 5B:
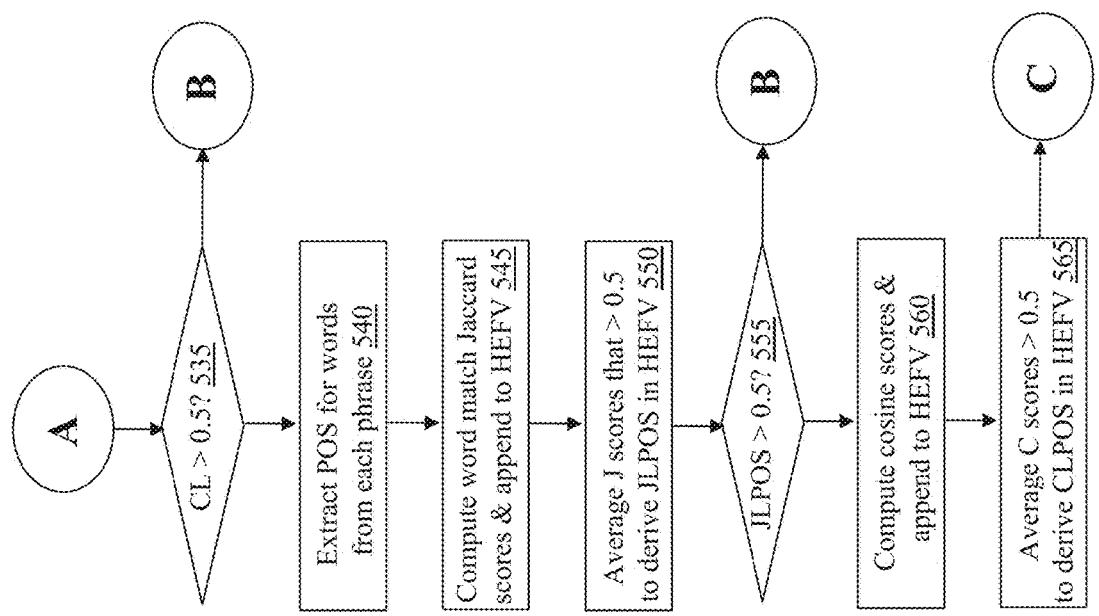
Figure 5C:
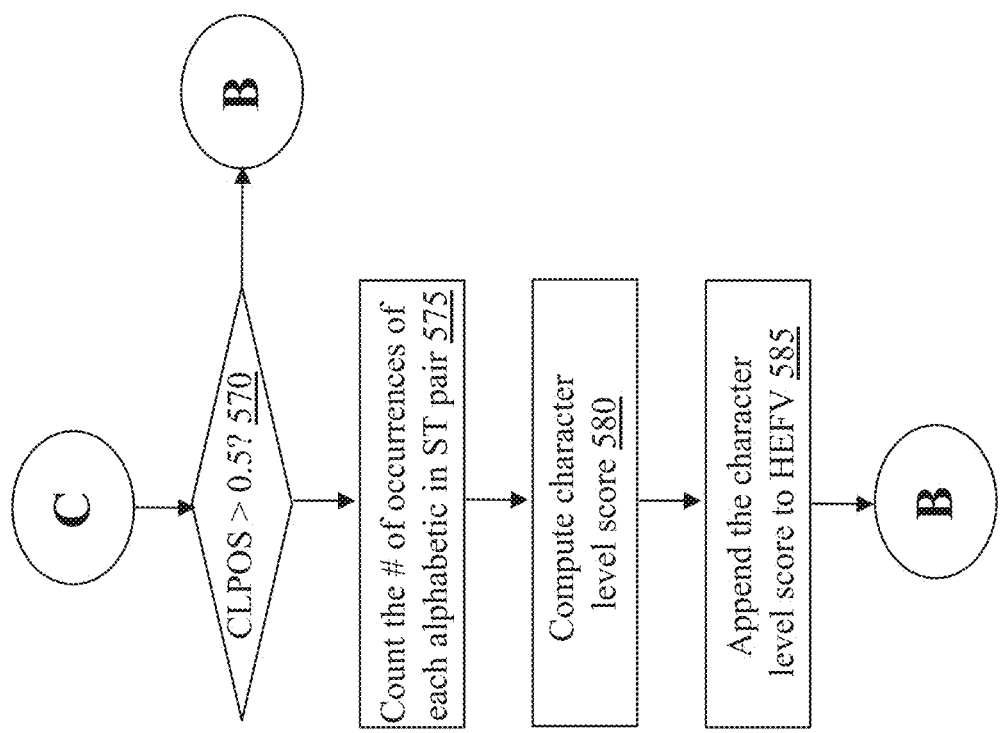
Figure 6:
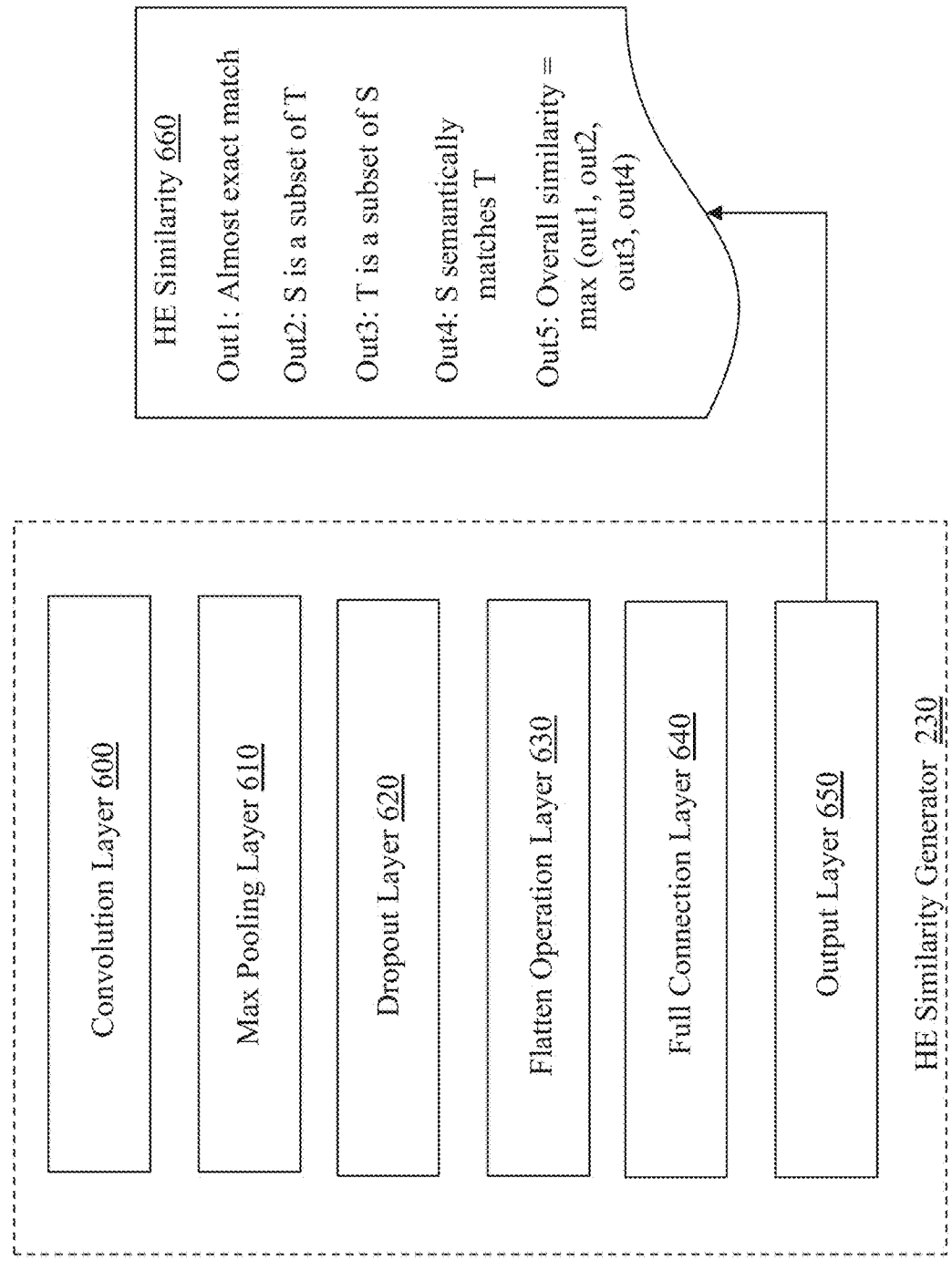
Figure 7:
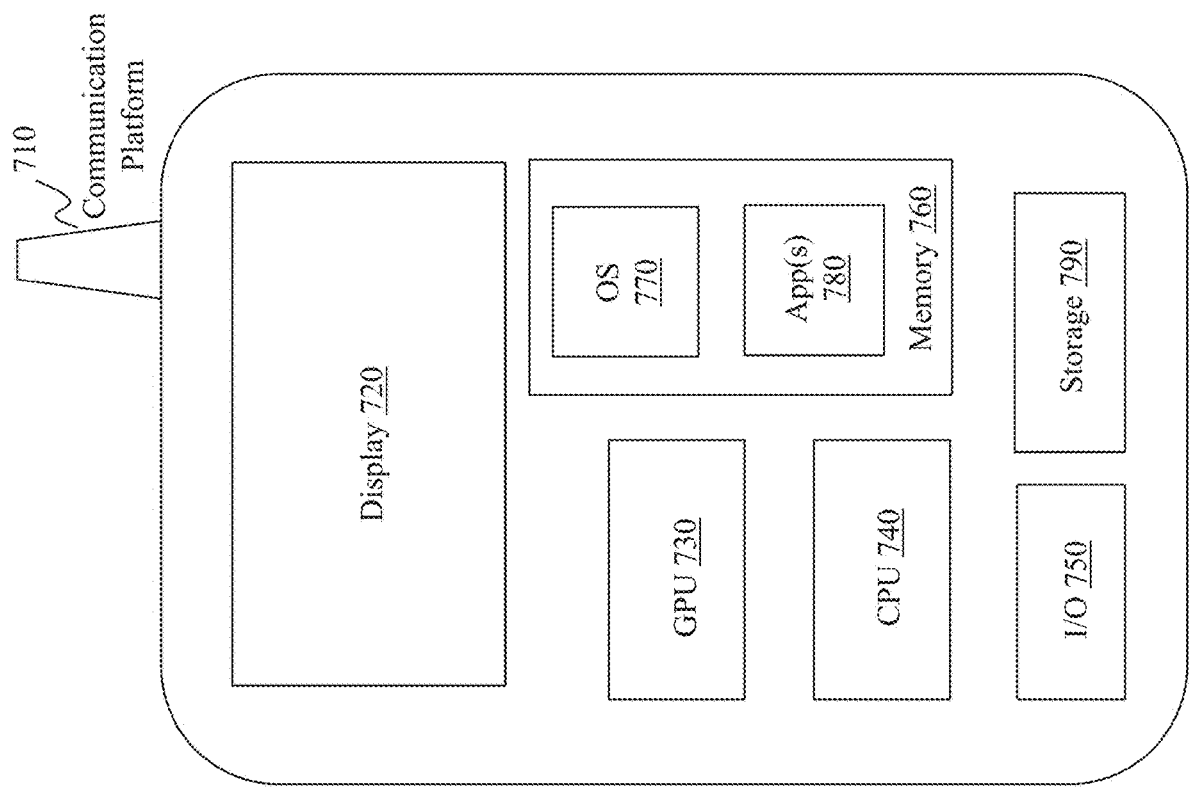

FIGS. 5A-5C correspond to flowcharts of an exemplary process for computing an HEF vector, in accordance with an embodiment of the present teaching;

FIG. 6 depicts an exemplary high-level architecture of an HE similarity generator, in accordance with an embodiment of the present teaching;

FIG. 7 is an illustrative diagram of an exemplary mobile device architecture that may be used to realize a specialized system implementing the present teaching in accordance with various embodiments; and FIG. 8 is an illustrative diagram of an exemplary computing device architecture that may be used to realize a specialized system implementing the present teaching in accordance with various embodiments.

DETAILED DESCRIPTION OF EXAMPLE EMBODIMENTS

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Embodiments of the present disclosure are directed to automated Q&A based on an enriched text similarity characterizing the likeness of different sets of text. To save operational costs, more and more companies take an effort to automate the process of answering customers' questions. To do so, companies may gather commonly asked questions and standard answers therefor and store them in a knowledge repository. The hope is that when such commonly asked questions are raised by customers again, the previously stored answers may be retrieved and provided to the customers. In this context, a question asked by a customer may be referred to as a source sentence. A sentence representing a prepared question (for which an answer is preprovided) may be referred to as a target sentence. When a source sentence matches a target sentence, an automated system may then retrieve the preprepared answer previously stored and provide it to the customer.

One challenge associated with such an automated solution is to recognize what a customer is asking, because customers may ask questions in different ways. For instance, a target sentence may be "cancel discovery bundle," while a source sentence may be "remove the discovery bundle." In this case, word "remove" is written by the customer to express the intent of asking to "cancel" the bundle. This difference may negatively impact the assessment of similarity by a search system. In another example, a choice of words may differ, e.g., a customer may express "refund not received now" in a source sentence instead of "refund not yet received" as found in a target sentence. In other situations, there may simply be some typographical errors or grammatical alterations in a source sentence, e.g., "transfer the amount to bank" may be typed while the customer means to express "transfer the amount to bank." A difference in either the number of words or the usage of words may have a significant impact on similarity. To address such issues, different solutions have been attempted. For instance, variations of a target sentence may be introduced, with different choices of words (such as synonyms or with spelling errors) introduced. A target sentence may be stored with its variations as a target group. Although this solution may have helped somewhat, it has not effectively remedied the problem because of other existing challenges.

Another challenge relates to the similarity metric itself. Traditional similarity measures are scalars. Although a scalar similarity may reflect an inverse of a distance between two points (e.g., representing, respectively, two sets of text in a multi-dimensional space), such a scalar similarity score delivers only a coarse-grained distinction and is usually sensitive to any minor changes in texts (e.g., the number of words). An additional word or a different word may result in dissimilarity even though these additional or different words do not actually impact the meaning of the query from a human perspective. As such, a traditional scalar similarity measure cannot capture the likeness between two texts in most situations.

From a lexical perspective, a sentence has a natural hierarchy that includes the sentence itself, words in the sentence, and characters in different words. According to the present teaching, a similarity between two sentences (source and target) may be assessed at different levels of the hierarchy. In some embodiments, phrases generated from source/target sentences may be used to capture different linguistic features and can be used for similarity assessment at phrase, word, and character levels. In some embodiments of the present teaching, a hierarchical explainable feature (HEF) vector may be constructed that incorporates measures derived from similarity assessment at different hierarchical levels. For example, with respect to each source sentence, an HEF vector is obtained based on one or more target sentences previously prepared. The HEF vector characterizes the likeness between the source sentence and the target sentences at multiple hierarchical levels. The HEF vector may then be used as the input to generate a hierarchical explainable (HE) similarity. In some embodiments, the HE similarity includes multiple attributes, each of which may correspond to a valuation of an assessment category. For example, exemplary assessment categories may include (1) "significantly exact match," "source is a subset of target," "target is a subset of source," "source matches semantically with target," and "overall similarity score." In this example, the HE similarity may correspond to a tuple with 5 attributes, each of which may be, e.g., a probability indicative of a likelihood that the source/target sentences satisfy the corresponding assessment. These exemplary assessment categories are semantically meaningful and also explainable, providing more insights as to the relationship between the source and target sentences. Compared with a traditional scalar similarity score, the HE similarity offers enriched information with explainable reasons as to how and why two texts are similar to each other. Details related to different aspects of the present teaching are provided below with reference to FIGS. 1A-6.

Figure 1A:
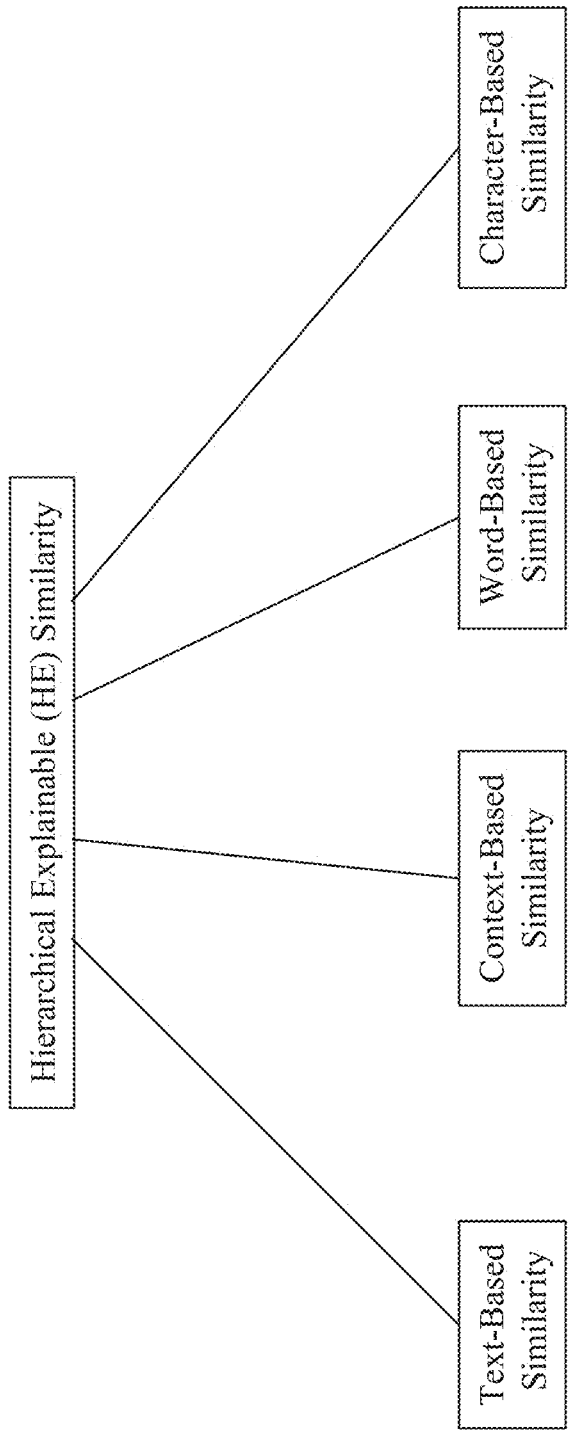
FIG. 1A depicts an exemplary construct of a hierarchical explainable (HE) similarity, in accordance with an embodiment of the present teaching.
Figure 1B:
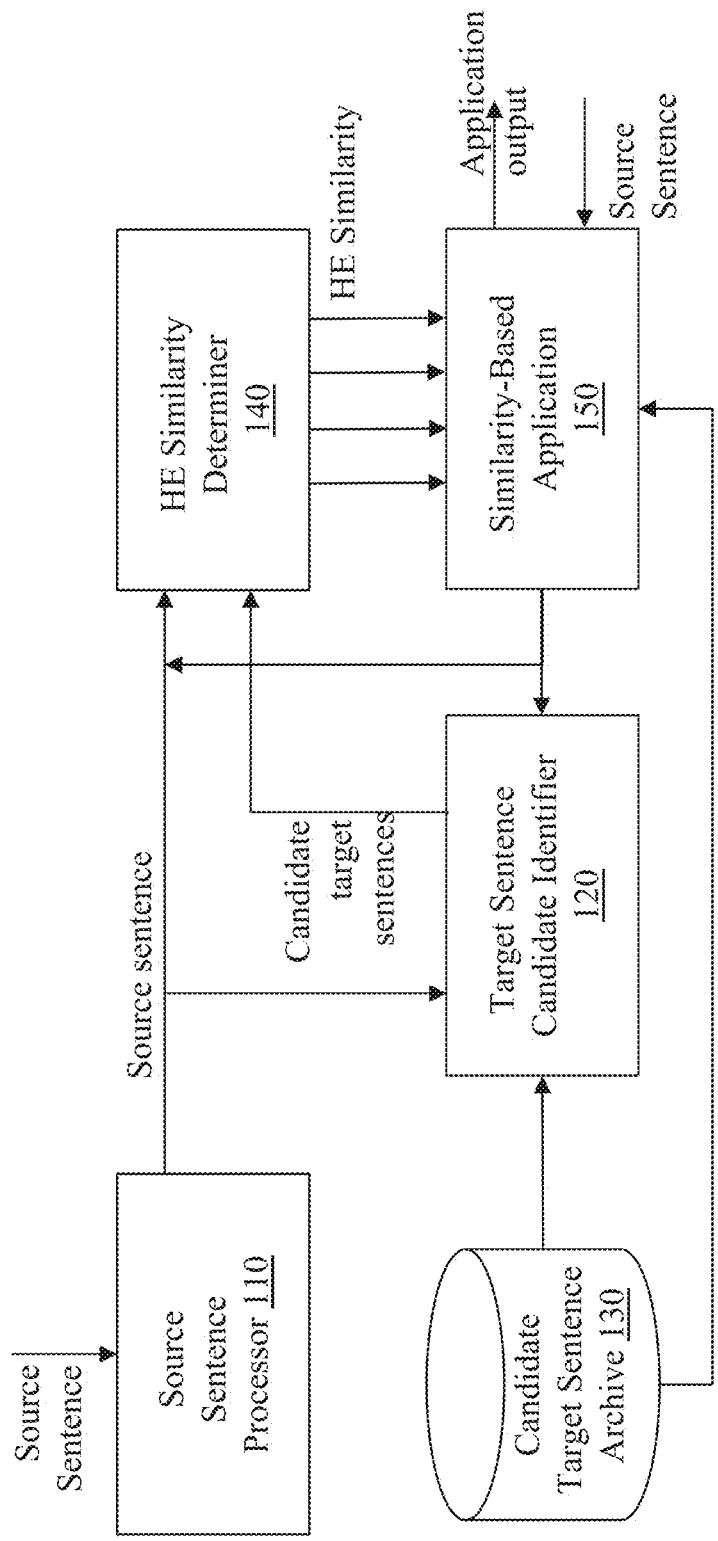
FIG. 1B depicts an exemplary high level system diagram of a framework for determination and use of an HE similarity by an application, in accordance with an embodiment of the present teaching.

FIG. 1A depicts an exemplary construct of a hierarchical explainable (HE) similarity, in accordance with an embodiment of the present teaching. In this illustration, the HE similarity includes assessment directed to, e.g., text-based similarity, context-based similarity, word-based similarity, as well as character-based similarity. As discussed herein, such an assessment may be made based on phrases obtained from a source sentence and corresponding target sentence (s), words as appeared in the phrases, and characters as used in the words. FIG. 1B depicts an exemplary high level system diagram of a framework 100 for determination and use of an HE similarity in some question and answer (Q&A) application, in accordance with an embodiment of the present teaching. As shown, the framework 100 comprises a source sentence processor 110, a target sentence candidate identifier 120, an HE similarity determiner 140, and a similarity-based application 150.

Figure 1C:
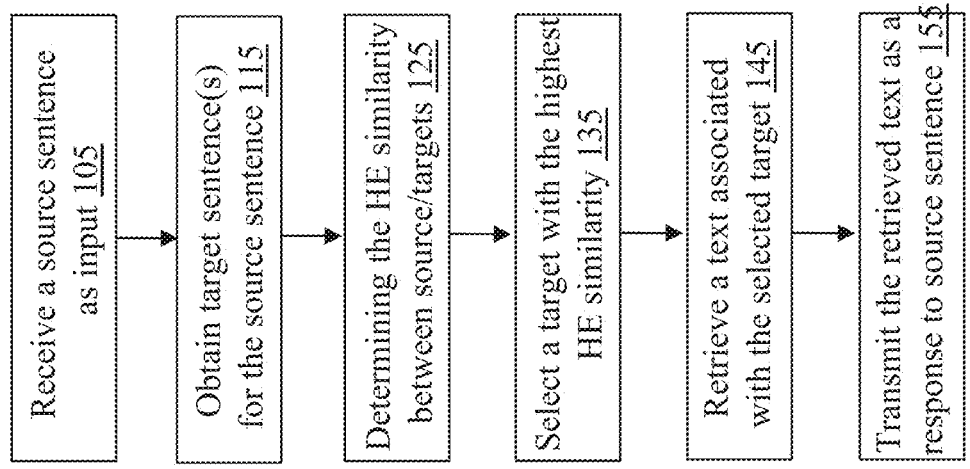
FIG. 1C is a flowchart of an exemplary process for determining and using a HE similarity by an application, in accordance with an embodiment of the present teaching.

FIG. 1C is a flowchart of an exemplary process for framework 100, in accordance with an embodiment of the present teaching. In this exemplary process, a source sentence is received at 105. Candidate target sentence(s) may then be identified at 115 by the target sentence candidate identifier 120, e.g., based on candidate target sentences archived in 130. The candidate target sentences may be identified via different means. For example, the source sentence and each archived target sentence may be compared according to some comparison scheme (e.g., word co-occurrences). If the comparison result satisfies some specified condition (e.g., 70% of word co-occurrence), the target sentence may be identified as a candidate target sentence for the source sentence. There may be other ways to identify a candidate target sentence such as the target sentences with the first word with a high percent of similarity, or ones selected at random, or manually identified.

In some embodiments, the target sentence(s) may include a target sentence as well as its variations generated based on, e.g., different ways of saying the same thing, use of synonyms or different words, or with some misspelled words, etc. Such variations may be generated by human operators or collected from some databases that archive such information. The source sentence and the candidate target sentence(s) are used as input by the HE similarity determiner 140 to compute, at 125, a HE similarity measuring the similarity between the given source sentence and the target sentence(s). Based on the HE similarity scores between the source and the targets, one or more of the target texts that have the highest HE similarity score are selected at 135. In exemplary embodiments, the HE similarity as disclosed herein is computed and then used by the Q&A system/application to select one or more target sentence as corresponding to a source sentence submitted by a customer. In some embodiments, the target sentence(s) that has the highest HE similarity with the source sentence may be selected. Based on the selected target sentence, a text (a document or an answer) associated with the selected target sentence may then be automatically retrieved, at 145, and transmitted, at 155, to the customer as an output of the Q&A system/application. With the example of the Q&A system, a pre-prepared answer for the selected target sentence may be retrieved as an answer to the question (source sentence) posted by a customer.

The similarity-based application 150 may be any system or program that processes input text and then acts according to a recognition of what the source sentence states. For example, the similarity-based application 150 may be operated by a company to maintain an automated call center for its customers for receiving questions/requests from customers and for providing automatically identified answers. In another example, the similarity-based application 150 may act as a customer service agent to handle service requests from customers in order to perform what is requested by each customer. For instance, when a new customer requests to open an account, the similarity-based application 150 may proceed to request appropriate inputs from the customer and then open an account based on the collected information. When an existing customer requests to cancel a subscribed service, then the similarity-based application 150 may proceed to terminate the service account accordingly. The similarity-based application 150 may also be an online redirection agent that operates to direct online traffic to appropriate, e.g., webpages or chatbots responsible for what is requested. In all these applications, the similarity-based application 150 obtains, from the HE similarity determiner 140, a HE similarity indicative of the likeness between a source sentence and a target sentence and then acts accordingly based on application needs. In some embodiments, the HE similarity determiner 140 may be an application as a service, which may be invoked by any application that seeks a similarity between a source sentence and one or more target sentences.

Figure 2A:
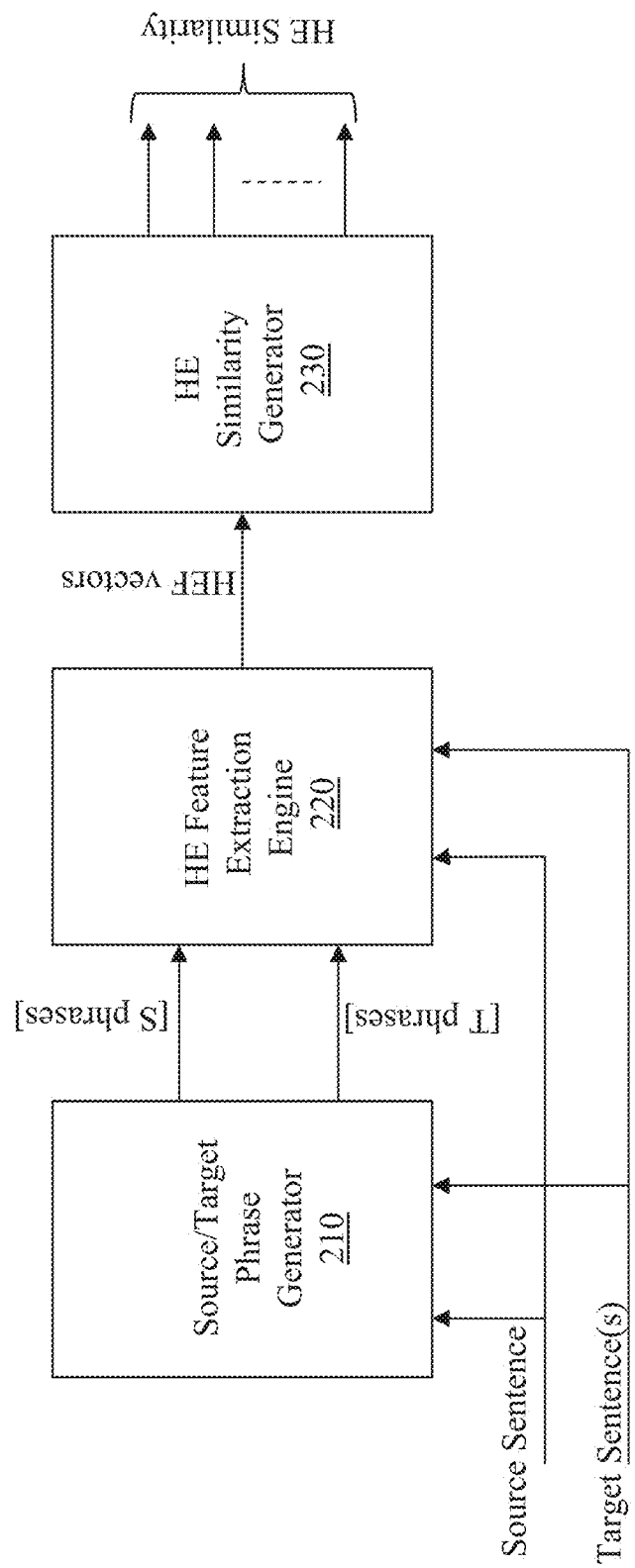
FIG. 2A depicts an exemplary high level system diagram of an HE similarity determiner, in accordance with an embodiment of the present teaching.

FIG. 2A depicts an exemplary high level system diagram of the HE similarity determiner 140, in accordance with an embodiment of the present teaching. In this illustrated embodiment, the HE similarity determiner 140 comprises a source/target phrase generator 210, a HE feature extraction engine 220, and a HE similarity generator 230. The HE similarity determiner 140 takes a source sentence and one or more target sentences as input (as shown in FIG. 1). The source/target phrase generator 210 is provided for generating a set of S phrases for input source sentence and a set of T phrases for input target sentence(s). The HE feature extraction engine 220 is provided for generating a HEF vector with various features therein computed based on similarity assessment directed to the levels of phrases, words, and characters. With the HEF vector associated with the input, the HE similarity generator 230 computes the HE similarity.

Figure 2B:
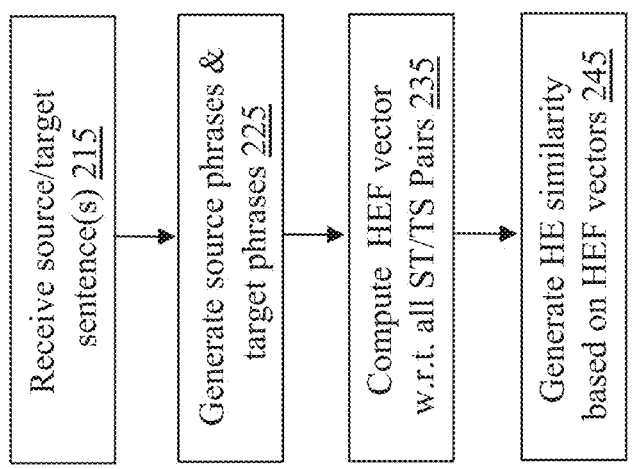
FIG. 2B is a flowchart of an exemplary process of an HE similarity determiner, in accordance with an embodiment of the present teaching.

FIG. 2B is a flowchart of an exemplary process of the HE similarity determiner 140, in accordance with an embodiment of the present teaching. When the source/target phrase generator 210 receives, at 205, the input source sentence and target sentence(s), it generates the set of S phrases, i.e., [S phrases], for the source sentence at 215, and the set of T phrases [T phrases] at 225. Based on [S phrases] and [T phrases], the HE feature extraction engine 220 computes, at 235, the HEF vector based on source/target phrase pairs (ST pairs) as well as target/source phrase pairs (TS pairs). The computed HEF vector is sent to HE similarity generator 230, which then generates, at 245, a HE similarity that, as discussed herein, may correspond to a tuple with multiple attributes. Details related to the source/target phrase generator 210, the HE feature extraction engine 220, and the HE similarity generator 230 are provided below with reference to FIGS. 3A-6.

Figure 3A:
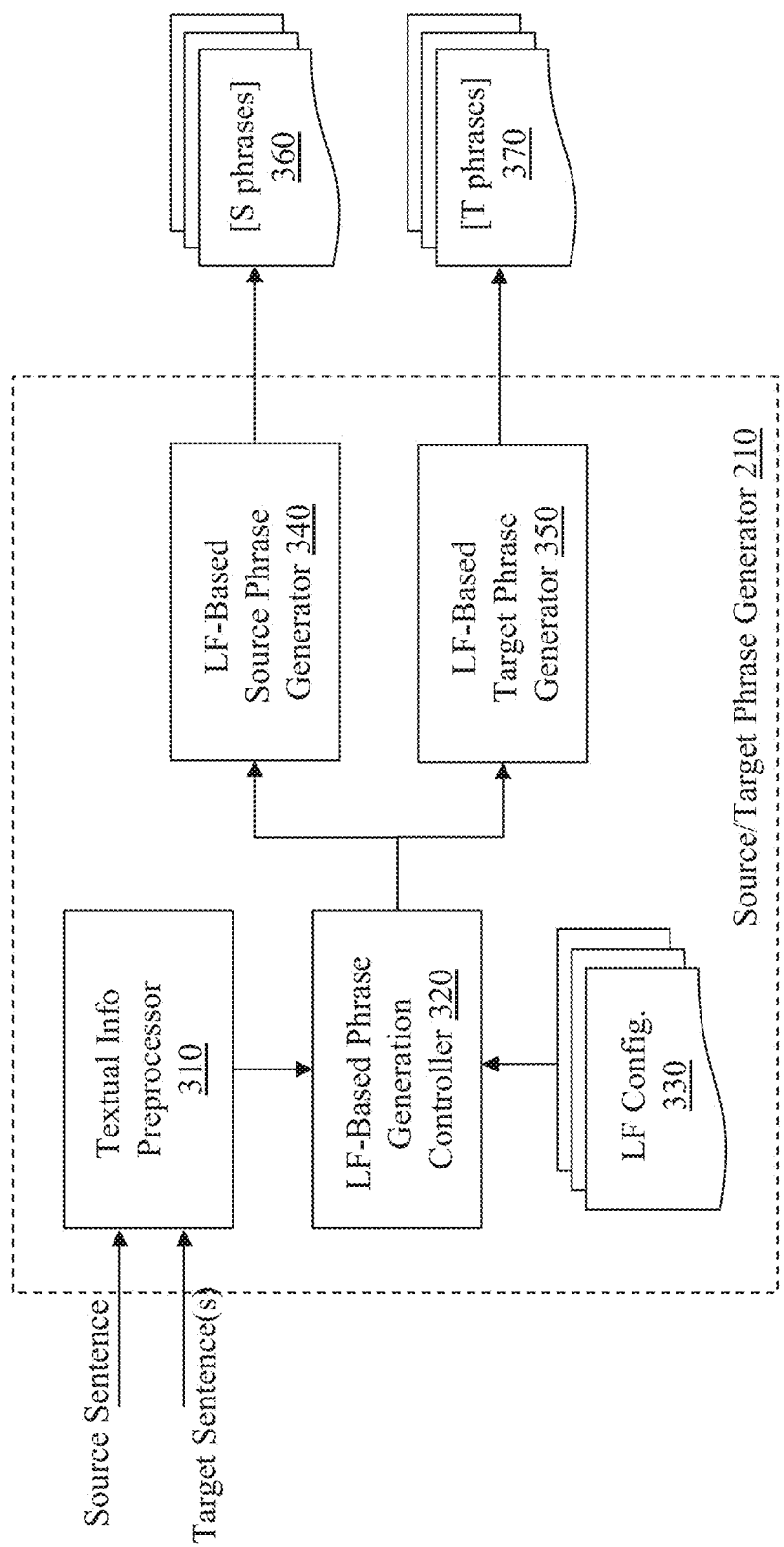
FIG. 3A depicts an exemplary high level system diagram of a source/target phrase generator, in accordance with an embodiment of the present teaching.

FIG. 3A depicts an exemplary high level system diagram of the source/target phrase generator 210, in accordance with an embodiment of the present teaching. The function of the source/target phrase generator 210 is to generate phrases based on input sentences (source and target) based on some specified criteria. In this illustrated embodiment, the source/target phrase generator 210 includes a textual information preprocessor 310, a linguistic feature (LF) based phrase generator controller 320, an LF-based source phrase generator 340, and a LF-based target phrase generator 350. The textual information preprocessor 310 is provided for pre-processing the input text (source and target sentences), which may include removal of punctuation or certain words (such as articles), converting upper case to lower case, etc. Based on preprocessed textual information, the LF-based phrase generator controller 320 accesses the LF configuration stored in 330 specifying, e.g., linguistic features to be used to generate phrases.

Figure 3B:
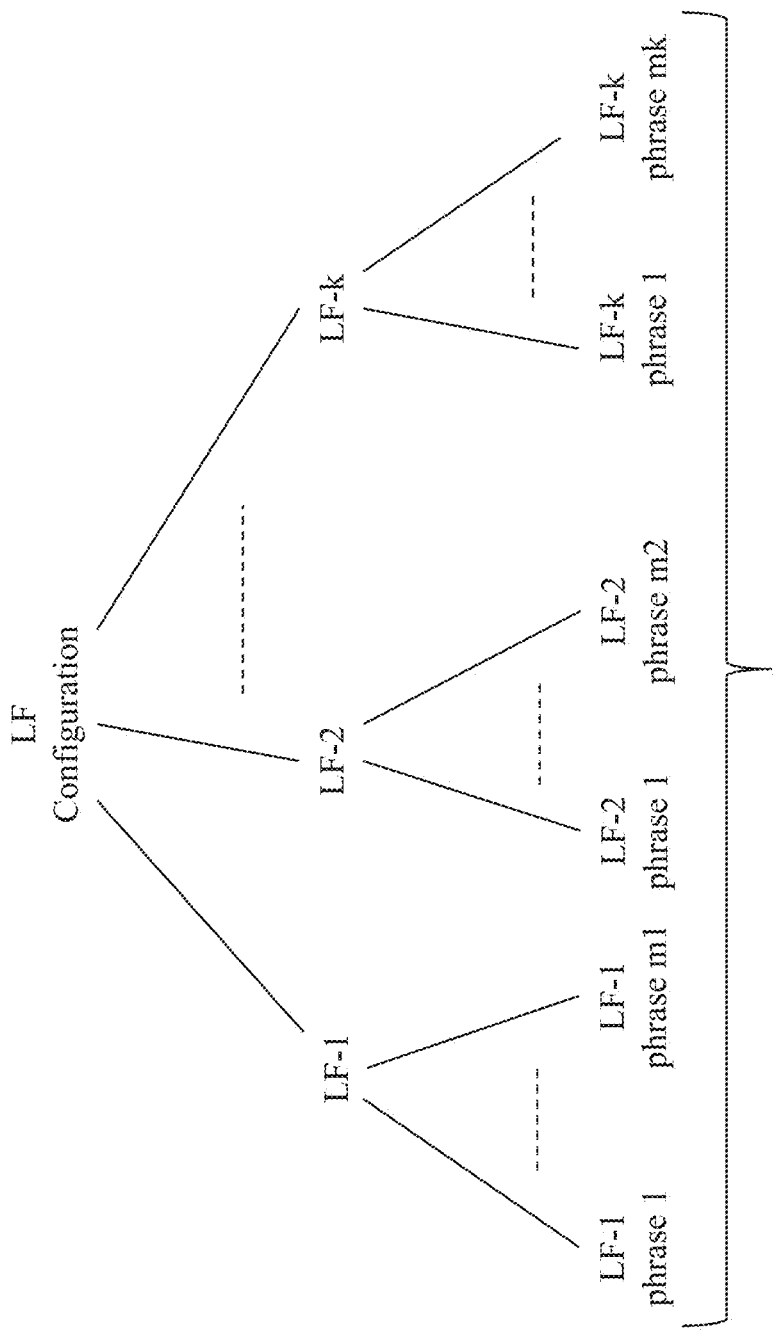
FIG. 3B shows an exemplary scheme of generating phrases of a sentence with respect to linguistic features, in accordance with an embodiment of the present teaching.

FIG. 3B shows an exemplary scheme of generating phrases of a sentence with respect to specified linguistic features, in accordance with an embodiment of the present teaching. As illustrated, LF configuration may specify k linguistic features, including LF-1, LF-2, . . . , LF-k. Linguistic features may be specified for controlling the generation of phrases to capture certain linguistic characteristics of input sentences. For example, linguistic features such as 5-grams, 10-grams, or 20-grams may be used to capture the relationships among words exhibited in a sentence. LF 5-gram may be applied to detect relationship among words in a sentence that are separated by a relatively short distance; while 20-gram may be used to capture relationship among words that are far apart in a sentence.

Figure 3C:
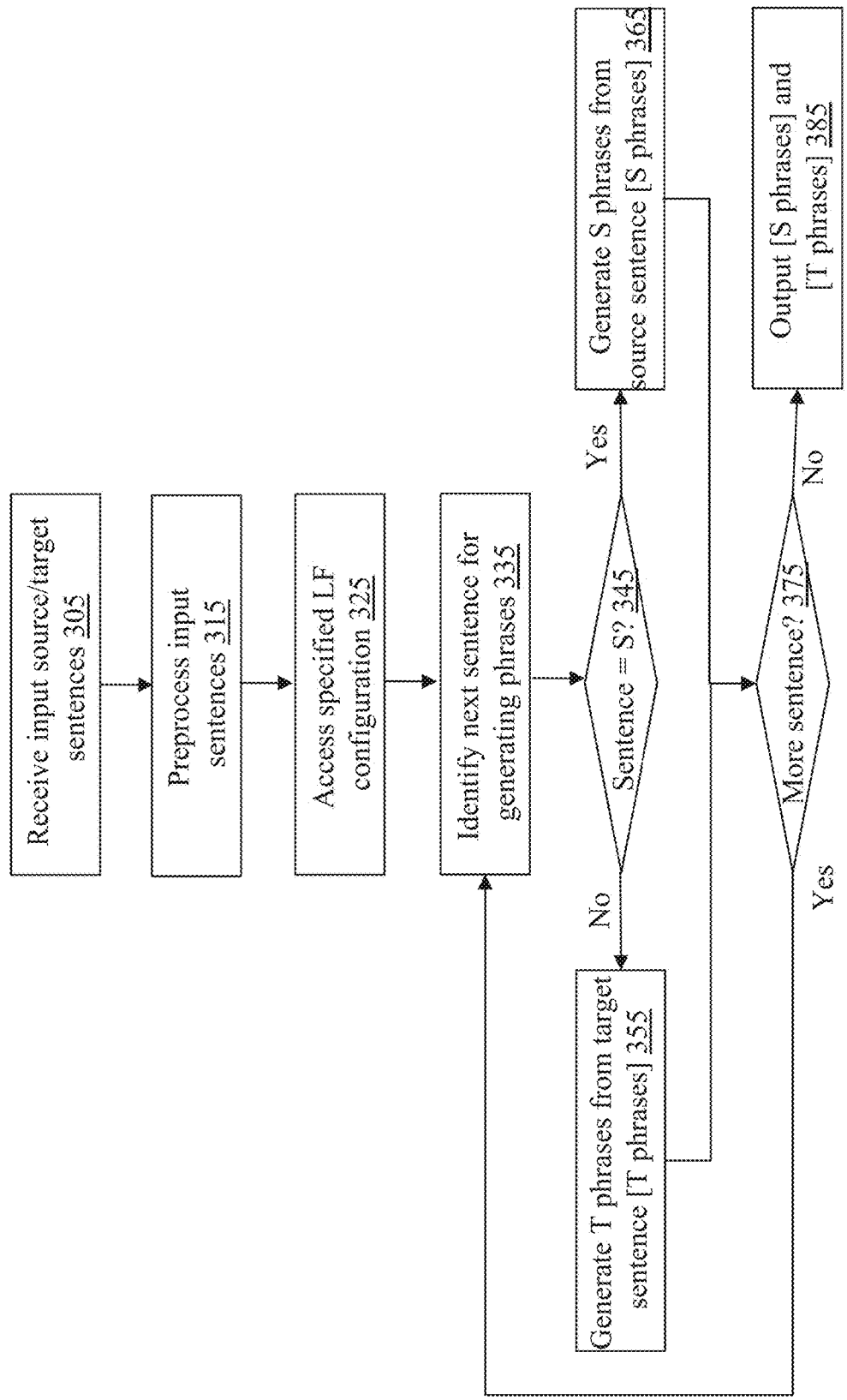
FIG. 3C is a flowchart of an exemplary process of a source/target phrase generator, in accordance with an embodiment of the present teaching.

Each of the LF as specified may be used to generate a set of phrases. As shown in FIG. 3B, using LF-1, e.g., 5-grams, may be used to control to generate m1 phrases, i.e., LF-1 phrase 1, . . . LF-1 phrase m1; using LF-2, e.g., 10-grams, may be used to control generation of m2 phrases, etc. Based on specified LFs, the LF-based phrase generation controller 320 invokes the LF-based source phrase generator 340 to generate the set of source phrases [S phrases] 360 and the LF-based target phrase generator 350 to generate the set of target phrases [T phrases] 370. FIG. 3C is a flowchart of an exemplary process of the source/target phrase generator 210, in accordance with an embodiment of the present teaching. When the textual information preprocessor 310 receives the input source/target sentences at 305, it preprocesses, at 315, the input sentences to generate texts appropriate for further processing. The LF-based phrase generation controller 320 accesses, at 325, the specified LF configuration from storage 330. After obtaining the next sentence (source or target) at 335, if it corresponds to the input source sentence, determined at 345, the LF-based source phrase generator 340 is invoked to generate, at 365, source phrases based on the specified LFs. The generated source phrases are then appended into [S phrases]. Otherwise, the LF-based target phrase generator 320 is invoked to generate, at 355, target phrases based on the specified LFs and the generated target phrased are appended into [T phrases]. When all input sentences are processed, determined at 375, the generated [S phrases] and [T phrases] are output at 385. Otherwise, the process goes back to 335 to obtain the next input sentence for phrase generation.

Figure 4A:
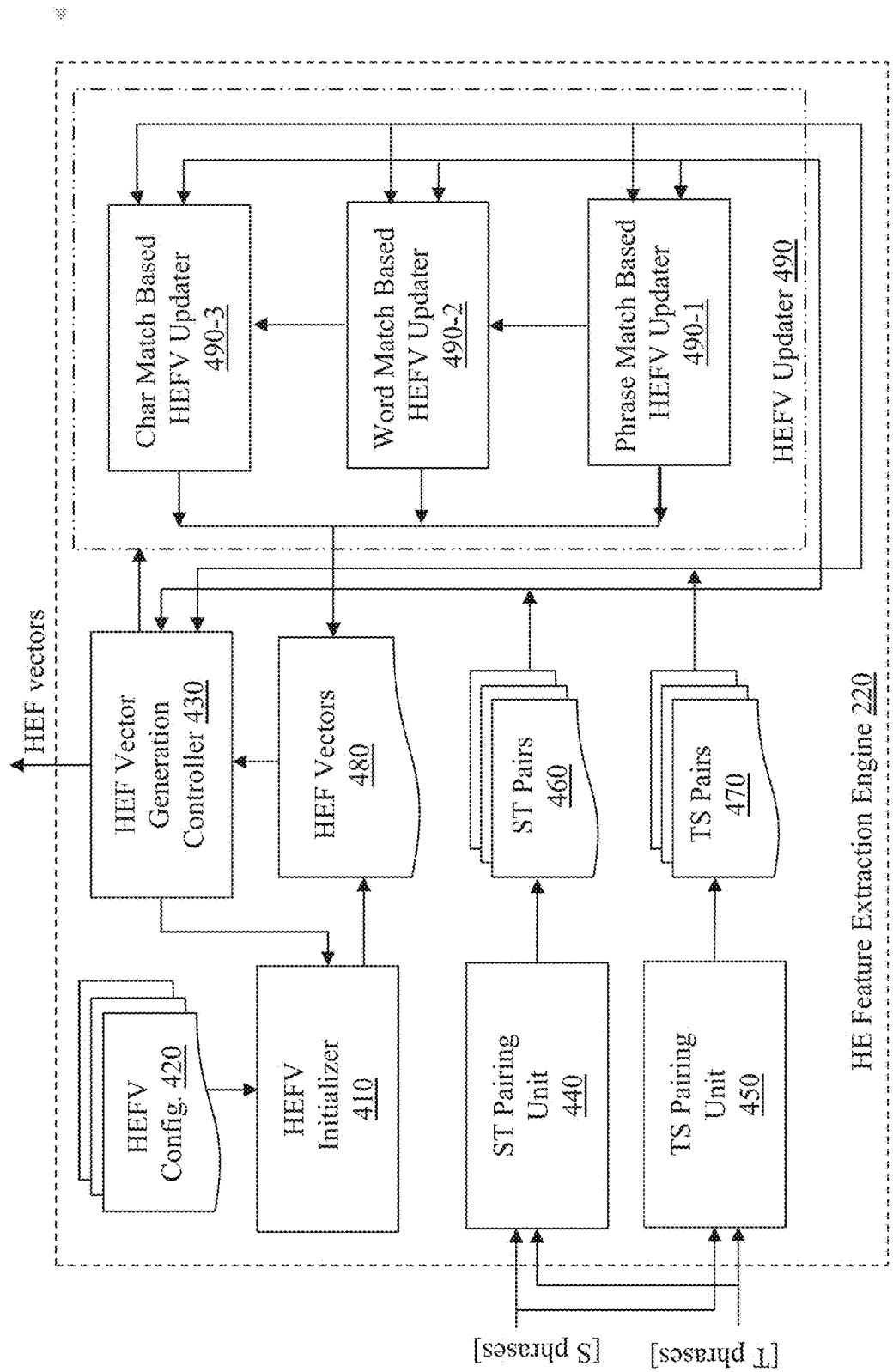
FIG. 4A depicts an exemplary high level system diagram of an HE feature extraction engine, in accordance with an embodiment of the present teaching.

FIG. 4A depicts an exemplary high level system diagram of the HE feature extraction engine 220, in accordance with an embodiment of the present teaching. As discussed herein, the HE feature extraction engine 220 is provided for obtaining the HEF vectors based on source/target phrase pairs. In this illustrated embodiment, the HE feature extraction engine 220 comprises a phrase pairing part, a control part, and a HEFV updater. The phrase pairing part is for generating [ST, TS] pairs for feature extraction. The control part is for initializing HEF vector and then controls the feature the process of updating the attributes in the initialized HEF vector. The HEFV updater part is for updating different attributes in the initialized HEF vector at different hierarchical levels based on the specific situation of each [ST, TS] pairs.

As shown in FIG. 4A, the phrase pairing part includes a ST pairing unit 440 for generating ST pairs 460 (source/target pairs) and a TS pairing unit 450 for generating TS pairs 470 (target/source pairs). For each source and each target phrase, there may be multiple ST pairs, e.g., including the ST pairs with respect to different LFs. For instance, there may be multiple source phrases and multiple target phrases for each of LFs. In this case, the ST pairs include multiple pairs of STs related to LF1 (e.g., 5-gram) and multiple pairs of STs related to LF 2 (e.g., 20-gram), etc. TS pairs may be similarly generated. As they are all related to the same source and target, they are used to compute a corresponding HEF vector.

The control part includes a HEFV initializer 410 for initializing HEF vectors 480 according to HEFV configuration 420 and a HEF vector generation controller 430 for identifying each [ST, TS] grouping based on ST pairs 460 and TS pairs 470. In some embodiments, a HEFV may be initialized to have all attributes to be set at a default value such as 0.0. Based on the ST and TS pairs, the control part then controls the HEFV updater part to compute assessment scores at different hierarchical levels based on the pairs and update the initialized attribute values in the HEF vector accordingly. The HEFV updater 490 comprises different updaters each of which is responsible for updating the attributes in HEFV at different levels, including a phrase match based HEFV updater 490-1, a word match based HEFV updater 490-2, and a character match based HEFV updater 490-3.

Figure 4B:
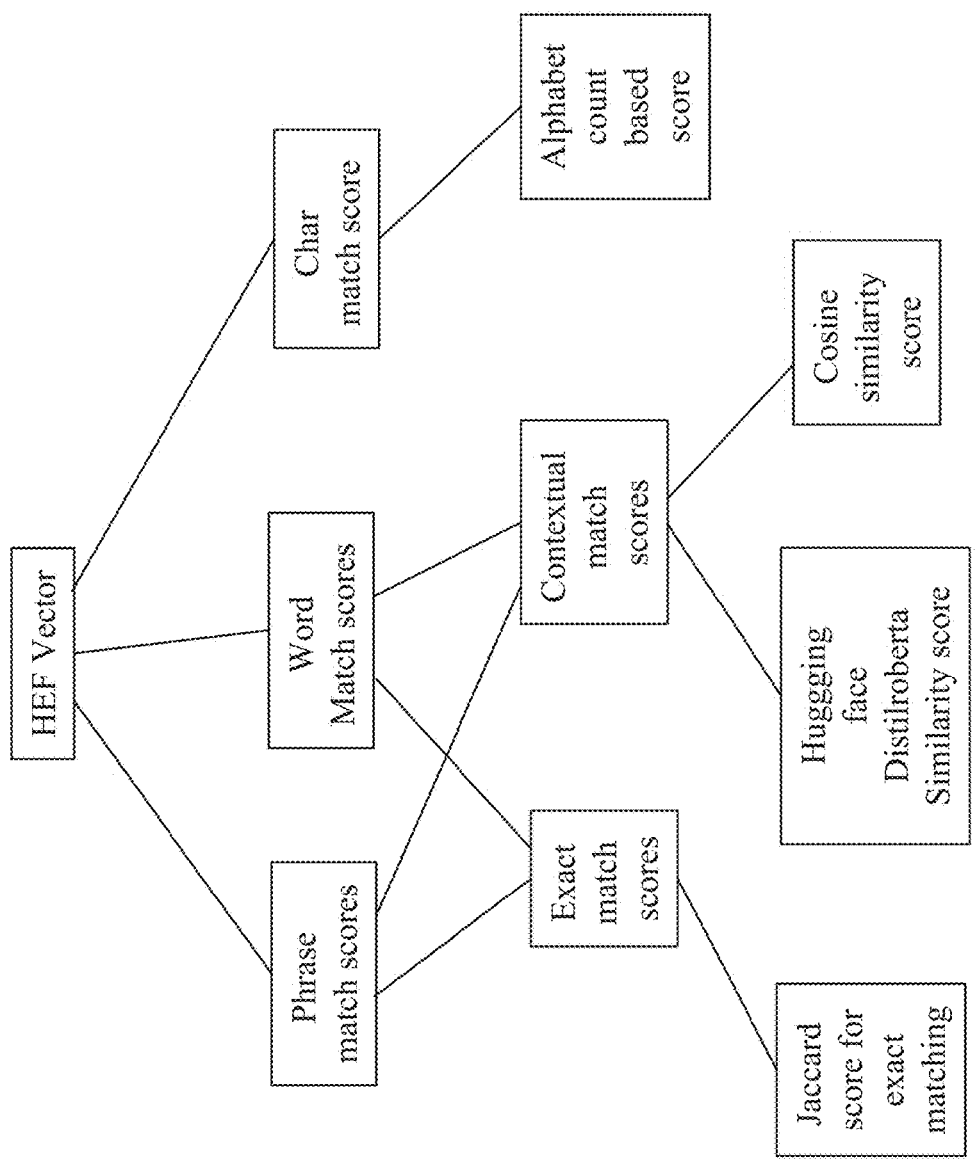
FIG. 4B shows exemplary components of a hierarchical explainable feature (HEF) vector, in accordance with an embodiment of the present teaching.

The HEF vector generated for each [ST, TS] grouping may include various attributes related to different aspects of the similarity assessment, including similarity assessed at different levels of the hierarchy as well as similarity assessed based on both exact and inexact matches at those levels. FIG. 4B shows exemplary attributes of a HEF vector, in accordance with an embodiment of the present teaching. The HEF vector may include similarity scores obtained by matching phrases, by matching words, and by matching characters. The similarity scores for phrase and word based matches may include scores from both exact and contextual (inexact) matches. In some embodiments, illustrative similarity scores for exact matches may include Jaccard exact matching scores. An illustrative inexact or contextual match score may include a Hugging face distilroberta similarity score and/or a cosine similarity score. At character matching level, a score based on alphabet counting may be employed.

In some embodiments, an exemplary HEF vector may include the following attributes: [ST5G_DS, ST5G_JL, ST5G_CL, ST5G_JLPOS, ST5G_CLPOS, ST5G_Chrl, ST20G_DS, ST20G_JL, ST20G_CL, ST20G_JLPOS, ST20G_CLPOS, ST20G_Chrl, TS5G_DS, TS5G_JL, TS5G_CL, TS5G_JLPOS, TS5G_CLPOS, TS5G_Chrl, TS20G_DS, TS20G_JL, TS20G_CL, TS20G_JLPOS, TS20G_CLPOS, TS20G_Chrl]

With respect to the above exemplary HEF vector composition, attributes starting with "ST" relate to a ST pair in a [ST, TS] grouping while "TS" relate to a TS pair in a [ST, TS] grouping. Attributes with "5G" therein relate to assessment of phrases generated using 5-gram LF and attributes with "20G" therein relate to assessment for phrases generated using 20-gram LF. Attributes with "DS" therein correspond to a distilroberta similarity score applied to phrase level matching. Attributes with "JL" therein correspond to Jaccard similarity scores applied to phrase level exact matching. Attributes with "CL" therein correspond to cosine similarity scores applied to phrase level inexact matching. Attributes with "JLPOS" therein corresponding to Jaccard similarity scores applied to word level exact matching based on POS tags of words. Attributes with "CLPOS" therein correspond to cosine similarity scores obtained by inexact matching at word level with POS tags. Attributes with "Chrl" therein correspond to a score derived based on character level matching by counting occurrences of alphabets. These exemplary similarity scores in this exemplary HEF vector composition are provided merely for illustrative purpose, and they are not to be interpreted to limit the scope of the present teaching. Other features and measurements for estimating the similarities at different hierarchical levels for exact and inexact based assessment may be utilized and are within the scope of the present teaching.

Figure 4C:
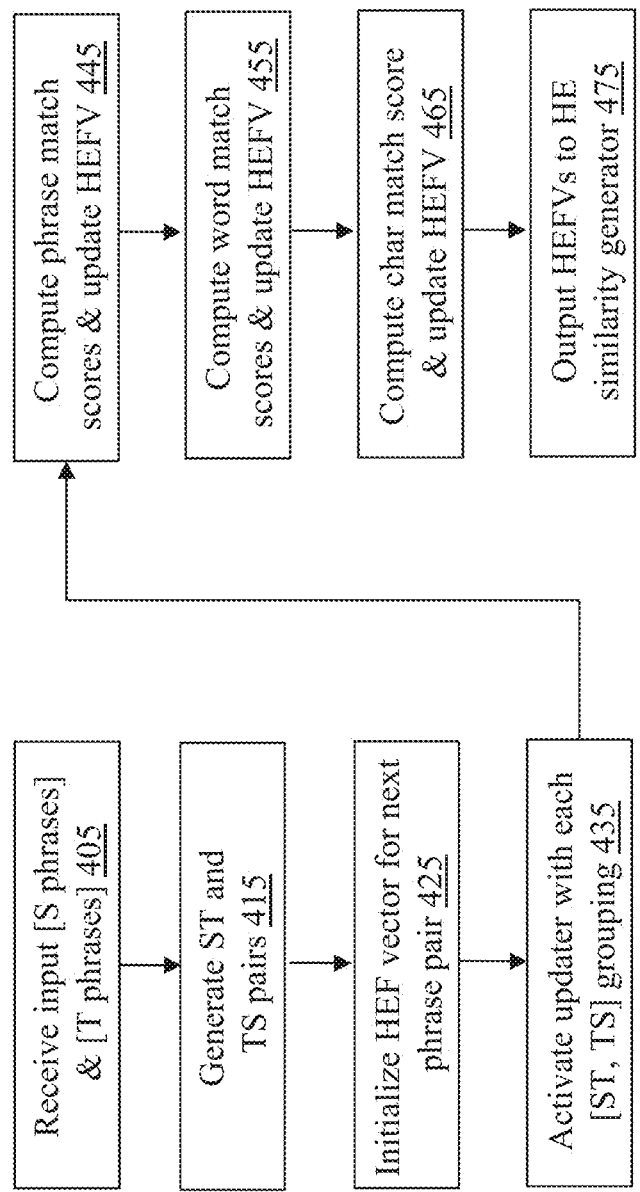
FIG. 4C is a flowchart of an exemplary process of an HE feature extraction engine, in accordance with an embodiment of the present teaching.

FIG. 4C is a flowchart of an exemplary process of the HE feature extraction engine 220, in accordance with an embodiment of the present teaching. In operation, when the [S phrases] 460 and [T phrases] 470 are received at 405, the ST pairs 460 and TS pairs 470 are generated at 415 by the ST pairing unit 440 and the TS pairing unit 450, respectively. Based on the ST pairs 460 and TS pairs 470, the HEF vector generation controller 430 invokes the HEFV initializer 410 to generate, at 425, an initialized HEF vector for each [ST, TS] grouping and stored the initialized HEF vectors 480. The HEFV updater 490 is activated at 435 to update attributes of the initialized HEFV corresponding to each [ST, TS] grouping.

Upon being activated, the phrase match based HEFV updater 490-1 computes at 445 the phrase match scores (both exact and inexact) and updates accordingly the attributes in HEFV related to phrase similarities. When the phrase match scores meet certain conditions (disclosed below), the phrase match based HEFV updater 490-1 activates the word match based HEFV updater 490-2 to perform word level similarity assessment. When invoked, the word match based HEFV updater 490-2 computes at 455 the word match scores (both exact and inexact) and updates accordingly the attributes in the HEFV related to word level similarities. When the word match based similarity scores meet certain conditions (disclosed below), the word match based HEFV updater 490-2 activates the character match based HEFV updater 490-3 to perform character level similarity assessment. When activated, the character match based HEFV updater 490-3 computes at 465 the character match scores and updates accordingly the attributes in the HEFV related to character level similarities. The updated HEF vector for each [ST, TS] grouping is then output, at 475. Details related to the operation of the phrase match based HEFV updater 490-1 are provided below with reference to FIGS. 5A-5C.

FIGS. 5A-5C correspond to flowcharts of an exemplary detailed process for updating an initialized HEF vector, in accordance with an embodiment of the present teaching. As discussed herein, when the HEFV updater 490 is activated, the three component units for updating the HEF vector at different hierarchical levels may operate in series based on some configured conditions. As discussed herein, assessment at the phrase level may be carried out first to update the attributes in the HEF vector related to phrase level assessment. Depending on the assessment at phrase level, the assessment at word level may or may not be carried out. For instance, if the phrase level assessment is satisfactory (e.g., a high similarity), the assessment at word/character levels may not be needed. However, if the word level assessment is needed, the word match based similarity assessment is accordingly carried out and the attributes in the HEF vector related to word level assessment may be updated. If the word level assessment satisfies certain conditions (e.g., high similarity), assessment at character level may or may not be activated.

In FIG. 5A, when the phrase match based HEFV updater 490-1 receives a [ST, TS] grouping with one or more phrase pairs (e.g., paired with respect to LFs), it computes exact similarity score(s) at 500 and updates corresponding attributes in initialized HEFV at 505. This may include exact matching scores for different ST and TS pairs with respect to different LFs, e.g., 5-gram phrase pairs and 20-gram phrase pairs. The phrase level Jaccard scores (JL) may be averaged at 510 based on such scored computed for all relevant pairs. For example, if there are 3 ST pairs of 5-gram phrases, there are three Jaccard scores which may be averaged to generate an average Jaccard score with respect to each LF. Using the above exemplary HEFV composition, the exact phrase level scores include ST5G_DS, ST5G_JL, ST20G_DS, ST20G_JL, TS5G_DS, TS5G_JL, TS20G_DS, and TS20G_JL. If an averaged JL score for exact phrase level matching is greater than a threshold (e.g., 0.5), determined at 515, the so far updated HEFV may be used as the output at 520. Using the above example, values ST5G_DS, ST5G_JL, ST20G_DS, and ST20G_JL of HEFV may be used as the output. In some embodiments, the output HEFV may include ST5G_DS, ST5G_JL, ST20G_DS, ST20G_JL, TS5G_DS, TS5G_JL, TS20G_DS, and TS20G_JL.

If the averaged JL does not satisfy a preset condition, it may indicate that the similarity via exact matching at the phrase level is not satisfactory. In this case, the phrase match based HEFV updater 490-1 proceeds to assess the similarity based on inexact match at the phrase level. That is, a contextual based similarity assessment is applied. A contextual or inexact matching is then performed to generate inexact matching scores, such as cosine scores. Similarly, averages of such inexact matching similarity scores with respect to different LFs may be computed, at 525, and used to average, at 530, so that the averaged values may be used to update the corresponding attribute values in HEFV (e.g., ST5G_CL, ST20G_CL, TS5G_CL, and TS20G_CL). If the averaged of these scores is greater than a threshold (e.g., 0.5), determined at 535, the updated HEFV may be used as the output at 520. In some embodiments, the updated attribute values ST5G_DS, ST5G_JL, ST20G_DS, ST20G_JL, ST5G_CL, ST20G_CL may be output. In some embodiments, the updated attribute values ST5G_DS, ST5G_JL, ST20G_DS, ST20G_JL, TS5G_DS, TS5G_JL, TS20G_DS, TS20G_JL, ST5G_CL, ST20G_CL, TS5G_CL, and TS20G_CL may be output.

Otherwise, it means that the phrase level assessment does not yield a satisfactory result (neither exact nor inexact assessment). In this case, the word level assessment is to be performed the word match based HEFV updater 490-2 is activated to first extract POS tags for words from phrases at 540 and then compute, at 545, exact word level matching similarity score (e.g., Jaccard score). The exact Jaccard scores for word matches (with respect to different LFs) are then used to update the corresponding attributes in HEFV. An average Jaccard score for all word level matching scores (5-gram and 20-grams) is determined at 550. If the average score satisfies a predetermined condition (e.g., JLPOS>0.5), determined at 555, the updated HEFV (with so far updated attributes) is output at 520. Otherwise, inexact word match may be applied to compute, at 560, word level similarity scores (e.g., cosine scores for contextual matching). Such inexact matching scores (with respect to LFs) at word level may then be averages at 565. It is then determined at 570 whether the averaged inexact matching score at word level satisfies a given condition (e.g., CLPOS>0.5). If it does, the HEFV with attribute values updated so far on exact/inexact phrase matching scores and exact/inexact word level matching scores are output at 520. Otherwise, the character match based HEFV updater 490-3 is activated to assess the similarity at the character level.

In some embodiments, with respect to a ST pair, the occurrence of each alphabet is counted at 575 and a character level match score is computed at 580 based on the counts and used to update the corresponding attribute values in HEFV (e.g., ST5G_Chrl and ST20G_Chrl). In some embodiments, with respect to each [ST, TS] grouping, the attribute values updated at character level may include ST5G_Chrl, ST20G_Chrl, TS5G_Chrl, and TS20G_Chrl). The updated HEFV is then output at 520. An example is provided to illustrate. Assume that that a source sentence is "Transfr the lne," the preprocessed source phrase may be "transfr lne." A target phrase may be "transfer line." Given this ST pair, the phrase level and word level similarity scores may be computed, and it may yield the following scores: averaged phrase DS similarity=0.36, the averaged phrase JL score=0.0, averaged phrase CL score=0.61, the averaged word level JLPOS score=0.0, the averaged word level CLPOS score=0.61. Given that, the assessment at character level is needed.

The alphabets occur in the source phrase include "t," "r," "a," "s," "f," "r," "l," and "e." The alphabets occur in the target phrase include 10 characters (including an extra "i"). In addition, character "e" occurs twice as opposed to once in the source phrase. Although there are discrepancies, most of the occurrences are consistent. In some embodiments, a character level similarity score for this example may be computed as $$Chrl = (\text{Sum}_{all\ alphabets}(\text{alphabet Count in } S/\text{alphabet Count in } T))/$$
$$\text{total \# of alphabets}$$

Plug in the counts in this example for each and every alphabet, the character level similarity score is:

$$Chrl = ((1.00/1.00) + (2.00/2.00) + (1.00/1.00) + (2.00/2.00) + (1.00/1.00) +$$
$$(1.00/1.00) + (1.00/2.00) + (1.00/1.00) + (1.00/1.00) +$$
$$(0.00/1.00))/10 = 0.95$$

where there are two discrepancies, 1.00/2.00 and 0.00/1.00. The former is related to alphabet "e" which occurs once in the source but occurs twice in the target. The letter is related to alphabet "i" which is completely missing in the source (i.e., 0.00) and occurs once in the target (i.e., 1.00). The total number of alphabets is 10. The character level similarity score is 0.95. Thus, this example shows that even though with misspellings in the source phrase, although exact match fails, the inexact matching related similarity scores at both phrase and word levels achieve a reasonable assessment. Although these errors negatively impact the similarity assessment at both phrase and word levels, such mistakes do not generally prevent a human from recognizing the similarity between a source and a target. The assessment at character level reveals that with these errors, the similarity at character level reaches a high 0.95 level. That is, the assessment at multiple levels according to the present teaching provides improved robustness.

As discussed herein, the HEF vectors derived for different pairings between source and target phrases capture features for different source/target pairs with assessment characteristics at different hierarchical levels for each pair. Such HEF vectors are then used by the HE similarity generator 230 (see FIG. 2A) as input features to compute the HE similarity tuple with explainable assessment categories. As illustrated in FIG. 6, an exemplary HE similarity tuple 660 include 5 categories, including a first assessment on whether there is an exact match, a second assessment on whether the source is a subset of the target, a third assessment on whether the target is a subset of the source, a fourth assessment on whether the source is semantically matching with the target, and a fifth assessment on a maximum overall similarity score. The last category may be directed to an optimal assessment so that the overall score may be obtained by taking a maximum score of the previous 4 categories. As seen from the above example, when certain discrepancies exist between a source and a target, assessment at some level (e.g., character level) may outperform that at other levels (e.g., phrase and word levels). The best assessment result in that example is consistent with real life experience so that a best result may be used as the overall similarity score.

To derive the HE similarity tuple, different implementations may be employed to take HEF vectors as input and generate the HE similarity 660 as the output. In some embodiments, an artificial neural network may be adopted as a learning mechanism that can be trained to understand the complex relationships between input HEF vectors and ground truth HE similarities provided with the training data. In some implementation, a convolutional neural network architecture may be used to realize the HE similarity generator 230. This is shown in FIG. 6, where a convolutional neural network has a plurality of layers, e.g., a convolution layer 600, a max pooling layer 610, a dropout layer 620, a flatten operation layer 630, a full connection layer 640, and an output layer 650. With this architecture, various parameters associated with the convolutional neural network may be learned during training, including, e.g., the parameters of the convolution kernels, weights on the connections between adjacent layers and full connection layers, etc. Such learned parameters incorporate the knowledge about the complex relationships between features included in the HEF vectors as well as the assessment defined according to the exemplary categories 660. The parameters may be continually updated with newly obtained training data so that the learning may be adaptive.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or a mobile computational unit in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.) and one or more applications 780 may be loaded into memory 760 from storage 790 in order to be executed by the CPU 740. The applications 780 may include a user interface or any other suitable mobile apps for information exchange, analytics, and management according to the present teaching on, at least partially, the mobile device 700. User interactions, if any, may be achieved via the I/O devices 750 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information processing and analytical method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   obtaining a target text based on a source text;
   determining a hierarchical explainable (HE) similarity that characterizes the similarity between the source text and the target text in terms of a plurality of assessment categories, wherein the HE similarity is derived by:
   generating a first set of source phrases from the source text and a second set of target phrases from the target text in accordance with at least one linguistic feature,
   generating source/target (ST) pairs, each of which includes a first phrase from the first set of source phrases and a second phrase from the second set of target phrases,
   generating target/source (TS) pairs, each of which includes a first phrase from the second set of target phrases and a second phrase from the first set of source phrases,
   initializing at least one hierarchical explainable feature (HEF) vector with respect to each [ST, TS] grouping,
   updating initial values of attributes in the HEF vector using similarity scores determined at a phrase match level, a word match level, and a character match level, respectively,
   and
   generating, via an artificial neural network (ANN) trained to understand relationships between input HEF vectors and ground truth HE similarities provided with training data, the HE similarity based on the updated HEF vector; and
   determining whether the target text relates to the source text based on the HE similarity.

2. The method of claim 1, wherein the plurality of assessment categories include at least some of:
   a first category on whether the source text and the target text are exact match;
   a second category on whether the source text is a subset of the target text;
   a third category on whether the target text is a subset of the source text;
   a fourth category on whether the source text semantically matches the target text; and
   a fifth category on an overall similarity score indicative of the likeness between the source and the target texts.

3. The method of claim 1, wherein the generating the first set of source phrases and the second set of target phrases comprises:
   accessing a linguistic feature (LF) configuration specifying at least one LF based on which phrases are to be generated;
   extracting the first set of source phrases from the source text in accordance with each of the at least one LF; and
   extracting the second set of target phrases from the target text in accordance with each of the at least one LF.

4. The method of claim 3, wherein each of the at least one LF corresponds to an x-gram, where x is an integer greater than one, wherein an LF with a smaller x is for capturing relationships among words in a phrase arranged in a close range and an LF with a larger x is for capturing relationships among words in a phrase that are arranged farther apart.

5. The method of claim 1, wherein
   the initializing the HEF vector with respect to each [ST, TS] grouping is based on a pre-specified default setting.

6. The method of claim 1, wherein the similarity scores at different levels comprise:
   similarity scores at the phrase match level including exact phrase match and inexact match scores;
   similarity scores at word match level including exact word parts-of-speech (POS) tags match and inexact word POS tag match scores; and
   similarity scores at character level obtained based on alphabet occurrences in the first phrase and a second phrase in a phrase pair.

7. The method of claim 1, wherein
   an input layer of the ANN receives the at least one HEF vector; and
   an output layer of the ANN includes a plurality of outputs, each of which corresponds each of the plurality of assessment categories.

8. Machine readable and non-transitory medium having information recorded thereon, wherein the information, when read by the machine, causes the machine to perform the following:
obtaining a target text based on a source text;
determining a hierarchical explainable (HE) similarity that characterizes the similarity between the source text and the target text in terms of a plurality of assessment categories, wherein the HE similarity is derived by
generating a first set of source phrases from the source text and a second set of target phrases from the target text in accordance with at least one linguistic feature,
generating source/target (ST) pairs, each of which includes a first phrase from the first set of source phrases and a second phrase from the second set of target phrases,
generating target/source (TS) pairs, each of which includes a first phrase from the second set of target phrases and a second phrase from the first set of source phrases,
initializing at least one hierarchical explainable feature (HEF) vector with respect to each [ST, TS] grouping,
updating initial values of attributes in the HEF vector using similarity scores determined at a phrase match level, a word match level, and a character match level, respectively,
and
generating, via an artificial neural network (ANN) trained to understand relationships between input HEF vectors and ground truth HE similarities provided with training data, the HE similarity based on the updated HEF vector; and
determining whether the target sentence relates to the source sentence based on the HE similarity.

9. The medium of claim 8, wherein the plurality of assessment categories include at least some of:
a first category on whether the source text and the target text are exact match;
a second category on whether the source text is a subset of the target text;
a third category on whether the target text is a subset of the source text;
a fourth category on whether the source text semantically matches the target text; and
a fifth category on an overall similarity score indicative of the likeness between the source and the target texts.

10. The medium of claim 8, wherein the generating the first set of source phrases and the second set of target phrases comprises:
accessing a linguistic feature (LF) configuration specifying at least one LF based on which phrases are to be generated;
extracting the first set of source phrases from the source text in accordance with each of the at least one LF; and
extracting the second set of target phrases from the target text in accordance with each of the at least one LF.

11. The medium of claim 10, wherein each of the at least one LF corresponds to an x-gram, where x is an integer greater than one, wherein an LF with a smaller x is for capturing relationships among words in a phrase arranged in a close range and an LF with a larger x is for capturing relationships among words in a phrase that are arranged farther apart.

12. The medium of claim 8, wherein
the initializing the HEF vector with respect to each [ST, TS] grouping is based on a pre-specified default setting.

13. The medium of claim 8, wherein the similarity scores at different levels comprise:
similarity scores at the phrase match level including exact phrase match and inexact match scores;
similarity scores at word match level including exact word parts-of-speech (POS) tags match and inexact word POS tag match scores; and
similarity scores at character level obtained based on alphabet occurrences in the first phrase and a second phrase in a phrase pair.

14. The medium of claim 8, wherein
an input layer of the ANN receives the at least one HEF vector; and
an output layer of the ANN includes a plurality of outputs, each of which corresponds each of the plurality of assessment categories.

15. A device comprising at least one processor, wherein the device is configured for:
obtaining a target text based on a source text;
determining a hierarchical explainable (HE) similarity that characterizes the similarity between the source text and the target text in terms of a plurality of assessment categories, wherein the HE similarity is derived by:
generating a first set of source phrases from the source text and a second set of target phrases from the target text in accordance with at least one linguistic feature,
generating source/target (ST) pairs, each of which includes a first phrase from the first set of source phrases and a second phrase from the second set of target phrases,
generating target/source (TS) pairs, each of which includes a first phrase from the second set of target phrases and a second phrase from the first set of source phrases,
initializing at least one hierarchical explainable feature (HEF) vector with respect to each [ST, TS] grouping,
updating initial values of attributes in the HEF vector using similarity scores determined at a phrase match level, a word match level, and a character match level, respectively,
and
generating, via an artificial neural network (ANN) trained to understand relationships between input HEF vectors and ground truth HE similarities provided with training data, the HE similarity based on the updated HEF vector; and
determining whether the target text relates to the source text based on the HE similarity.

16. The system of claim 15, wherein the plurality of assessment categories include at least some of:
a first category on whether the source text and the target text are exact match;
a second category on whether the source text is a subset of the target text;
a third category on whether the target text is a subset of the source text;
a fourth category on whether the source text semantically matches the target text; and
a fifth category on an overall similarity score indicative of the likeness between the source and the target texts.

17. The system of claim 15, wherein the generating the first set of source phrases and the second set of target phrases comprises:
accessing a linguistic feature (LF) configuration specifying at least one LF based on which phrases are to be generated;

extracting the first set of source phrases from the source text in accordance with each of the at least one LF; and extracting the second set of target phrases from the target text in accordance with each of the at least one LF.

18. The system of claim 17, wherein each of the at least one LF corresponds to an x-gram, where x is an integer greater than one, wherein an LF with a smaller x is for capturing relationships among words in a phrase arranged in a close range and an LF with a larger x is for capturing relationships among words in a phrase that are arranged farther apart.

19. The system of claim 15, wherein
the initializing the HEF vector with respect to each [ST, TS] grouping is based on a pre-specified default setting.

20. The system of claim 15, wherein the similarity scores at different levels comprise:
similarity scores at the phrase match level including exact phrase match and inexact match scores;
similarity scores at word match level including exact word parts-of-speech (POS) tags match and inexact word POS tag match scores; and
similarity scores at character level obtained based on alphabet occurrences in the first phrase and a second phrase in a phrase pair.

21. A method, comprising:
receiving an input source text;
identifying, based on the input source text, a plurality of target texts;
determining a hierarchical explainable (HE) similarity characterizing a similarity of each pair of the source text and respective one of the plurality of target texts, wherein the HE similarity is derived by:
generating a first set of source phrases from the source text and a second set of target phrases from the target text in accordance with at least one linguistic feature,
generating source/target (ST) pairs, each of which includes a first phrase from the first set of source phrases and a second phrase from the second set of target phrases,
generating target/source (TS) pairs, each of which includes a first phrase from the second set of target phrases and a second phrase from the first set of source phrases,
initializing at least one hierarchical explainable feature (HEF) vector with respect to each [ST, TS] grouping,
updating initial values of attributes in the HEF vector using similarity scores determined at a phrase match level, a word match level, and a character match level, respectively, and
generating, via an artificial neural network (ANN) trained to understand relationships between input HEF vectors and ground truth HE similarities provided with training data, the HE similarity based on the updated HEF vector;
selecting one of the plurality target texts as relating to the input source text based on the HE similarity of the pair involving the target text;
retrieving a related text associate with the selected target text; and
transmitting the retrieved related text as a response to the input source text.

* * * * *